United States Patent
Holzapfel

[19]

[11] Patent Number: 5,874,729
[45] Date of Patent: Feb. 23, 1999

[54] DEVICE FOR FILTERING ODD-NUMBERED HARMONIC SIGNAL COMPONENTS

[75] Inventor: Wolfgang Holzapfel, Obing, Germany

[73] Assignee: Johannes Heidenhain GmbH, Traunreut, Germany

[21] Appl. No.: 893,935

[22] Filed: Jul. 15, 1997

[30] Foreign Application Priority Data

Jul. 16, 1996 [DE] Germany .................. 196 28 602.6

[51] Int. Cl.⁶ .................................................. G01D 5/34
[52] U.S. Cl. .................................. 250/231.16; 250/237 G
[58] Field of Search ............... 250/231.16, 231.18, 250/226, 237 G, 231.13; 356/356, 395, 396

[56] References Cited

U.S. PATENT DOCUMENTS

| | | | |
|---|---|---|---|
| 4,602,436 | 7/1986 | Ernst | 250/237 G |
| 5,583,798 | 12/1996 | Franz et al. | 364/561 |
| 5,604,345 | 2/1997 | Matsuura | 250/237 G |
| 5,726,445 | 3/1998 | Thaler et al. | 250/237 G |

FOREIGN PATENT DOCUMENTS

| | | |
|---|---|---|
| 0 157 177 B1 | 2/1985 | European Pat. Off. . |
| 0 541 828 A1 | 4/1991 | European Pat. Off. . |
| 0 541 828 B1 | 11/1991 | European Pat. Off. . |
| 0 645 607 A1 | 3/1995 | European Pat. Off. . |
| 0 714 015 A2 | 5/1996 | European Pat. Off. . |

*Primary Examiner*—Que T. Le
*Attorney, Agent, or Firm*—Brinks Hofer Gilson & Lione

[57] ABSTRACT

A device that is suitable for filtering odd-numbered harmonic signal components out of a periodic signal which is generated from the scanning of a periodic scale graduation using the scanning plate. The scanning plate includes a periodic sequence of individual filter elements in the measuring direction for the resulting periodicity P of the filter elements, the condition $P = N \cdot d_A$ applies, and N is an odd-numbered integer greater than 1, and $d_A$ is a period of a scanning graduation of a scanning plate without filtering action. In the filter elements, there is a symmetrical arrangement of structural elements such that inside each filter element two complementary halves of structural elements are each provided.

16 Claims, 3 Drawing Sheets

DEVICE FOR FILTERING ODD-NUMBERED HARMONIC SIGNAL COMPONENTS

FIELD OF THE INVENTION

The present invention relates to a device for filtering odd-numbered harmonic signal components, which in particular corrupt a signal that is used in a position measuring instrument to determine the change of position of two objects movable relative to one another.

BACKGROUND OF THE INVENTION

In known incremental position measuring instruments, typically a periodic scale graduation is scanned with a likewise periodic scanning structure, and the resultant signal is further used elsewhere as a measurement signal. In the ideal scanning situation, as exactly sinusoidal a signal as possible would be available. In such a situation, further signal subdivision can be done by known interpolation methods. However, for several reasons, usually the output signal shape departs from the ideal sinusoidal shape. For example, the division ratios of the scale graduation and scanning graduation may deviate from ideal. Also edge fuzziness in the scale graduation bars corrupts the resultant signal. As a general rule, the signals to be evaluated thus have harmonic components. In order to have exact positional determinations in incremental position measuring instruments, however, the most harmonic-free scanning signals as possible are necessary.

A number of proposals have been disclosed to attempt to obtain the most harmonic-free measurement signals in incremental angle and length measuring systems. One proposal involves filtering the harmonic components of the measurement signal. The filtering technique always involves the use of a specially designed scanning plate to create the most optimized possible superposition of various signal components, phase-displaced from one another. In a number of applications, only certain harmonics are eliminated since filtering out all the existing harmonic components would greatly impair the degree of modulation of the fundamental. The phase-displaced signal components required to eliminate harmonic components are generated at various scanning sites on the sides of the scanning plate.

The necessary extent or length of the scanning area for the desired filtration is called the filter length. In the normal situation, it extends in the measuring direction, or in other words in the direction in which a relative displacement takes place between a scale graduation and a scanning graduation.

European Patent Disclosure No. EP 157 177 describes a so-called adiabatic filter arrangement in which inside the scanning area of the scanning plate a "slow change" in the center position of the bars over the complete scanning field is designed in accordance with a predetermined function. The complete filter length is typically an order of magnitude of 10 to 100 graduation periods of the scale graduation or scanning graduation.

European Patent Disclosure No. EP 645 607 describes a mixed filter arrangement. Here the sequence of bar displacements of an adiabatic filter, ordered normally in accordance with the above-explained function, are mixed by a deterministic or random method. The resultant effective filter length is approximately 3 to 10 graduation periods.

European Patent Disclosure No. EP 541 828 describes a short-period filter arrangement. This includes a period arrangement of a group with only a few bars, with the center positions of the bars and/or the widths of the bars being varied within the group such that a filtration of certain harmonic filter components is attained, typically odd-numbered harmonics. In this filter arrangement, the filter length is identical with the period of the intended group of lines and is approximately 3 to 5 graduation periods, depending on the filter version chosen.

Filters with more than one bar per graduation period are also known, for example from European Patent Application No. EP 95 109 701.3, not yet published, which is assigned to the present assignee. In the case of large or coarse graduation periods, a cosine transmission function of the scanning plate, which is required for optimal filtration of harmonics, is approximated by a plurality of fine bars within one graduation period. The resultant filter length accordingly amounts to one division.

With the aid of the scanning plate designed by these principles, the harmonic content of a periodic pattern of stripes, which is generated by a periodic scale graduation on the scanning plate, is filtered. However, because of given structural features, the scanning plate must be positioned in the beam path of the position measuring instrument upstream of the scale graduation; that is, the beams emitted by a light source with appropriate optics in front of it first pass through the scanning plate and only after that reach the scale graduation. In such arrangements, the term inverse scanning order will be used. Such inverse scanning arrangements also occur in incident-light position measuring instruments, for example, in which once again the corresponding beams pass first through the scanning plate and then project an intensity pattern onto the scale graduation. Scanning arrangements are also known in which a displaceable scale graduation is projected by a scanning graduation onto a second scanning graduation; that is, two scanning graduations are provided.

In the case where there are very small scanning distances between the scale graduation and the scanning graduation and in which an intensity distribution on the scale or a further scanning grating is determined solely by the shadow cast by the scanning plate, each of the aforementioned filter arrangements can in principle also be used in other scanning arrangements, for example in the aforementioned inverse scanning arrangements. However, if the scanning distances increase, then the intensity distribution on the scale is caused not only by the resultant cast shadow, on the contrary, diffraction phenomena are also involved, which impair or eliminate the filtering action of the filter arrangements known thus far. The reason for this is the phase displacements that the beams of light undergo in propagation between the various gratings, so that different phase displacements result for the various orders of diffraction. Accordingly, the maximum allowable scanning distance is directly dependent on the filter length chosen. The greater the filter length is, the greater the allowable or tolerable scanning distance range. Of the filter arrangements discussed above, it is therefore only the adiabatic filter arrangements that are usable for most average scanning distances. Long filter lengths, on the other hand, have still other disadvantages, since local soiling and/or local discontinuities of the scale graduation each cause a major phase displacement of the scanning signals, which is dependent on the scale position. This is because the superposition and hence the balance of the phase-displaced signal components of the fundamental are interfered with. As a consequence, there are major errors in the ensuing interpolation of the output signals.

In most known position measuring instruments, it is necessary merely to filter out certain harmonic signal components. The odd-numbered harmonic signal components (n=3, 5, 7, . . . ) have an especially disturbing effect on the output signals. The even-numbered harmonic signal components (n=2, 4, 6, . . . ) can normally be largely suppressed by known differential switching of push-pull signals. Moreover, suppression of the even-numbered harmonic signal components results in a known manner because of the embodiment of the scale or scale graduation, if the scale or the scale graduation has a line width that is on the order of magnitude of half the graduation period.

It is thus desirable to provide a device for filtering odd-numbered harmonic signal components in an incremental position measuring instrument that has the shortest possible filter length and which can be used in various scanning arrangements, for example, the aforementioned inverse scanning arrangements in which the light arriving from a light source first passes through the scanning plate and only then reaches a scale graduation. In addition, the desired filtering action should be independent of the scanning distance.

SUMMARY OF THE INVENTION

According to a first aspect of the invention, there is provided a scanning plate for filtering odd-numbered harmonic signal components from a periodic signal that is generated by scanning a periodic scale graduation with the scanning plate. The scanning plate includes a periodic sequence of individual filter elements in a measuring direction wherein for a resultant period P of the filter elements the condition $P=N \cdot d_A$ applies, where N is an odd integer greater than 1 and $d_A$ is the period of a scanning graduation for a scanning plate without filtering action, and a symmetrical arrangement of structural elements is provided in each filter element, so that two complementary halves with structural elements are provided in each filter element.

According to a second aspect of the invention, there is provided a position measuring instrument for detecting linear or rotary motion. The position measuring instrument includes a light source; a period scale graduation located downstream of the light source; and a scanning plate located between the light source and periodic scale graduation for filtering odd-numbered harmonic signal components from a periodic signal that is generated by scanning the periodic scale graduation with the scanning plate, the scanning plate having a periodic sequence of individual filter elements in a measuring direction wherein for a resultant period P of the filter elements the condition $P=N \cdot d_A$ applies, where N is an odd integer greater than 1 and $d_A$ is the period of scanning graduation for a scanning plate without filtering action and a symmetrical arrangement of structural elements provided in each filter element so that two complementary halves with structural elements are provided in each filter element.

The device according to the invention for filtering odd-numbered harmonic signal components now enables a distance-independent filtration of interfering or undesired harmonic components out of the measurement signal, and especially the filtration of odd-numbered harmonics. The result is a capability for high-precision further processing or interpolation of the output signals.

The device according to the invention can moreover be adapted, depending on the application, in such a way to the measuring arrangement selected that with it a purposeful elimination of certain odd-numbered harmonic components becomes possible.

Further advantages as well as details of the device of the invention will become apparent from the ensuing description of exemplary embodiments in conjunction with the accompanying drawings.

DETAILED DESCRIPTION OF THE PRESENTLY PREFERRED EMBODIMENTS

Figure 1:
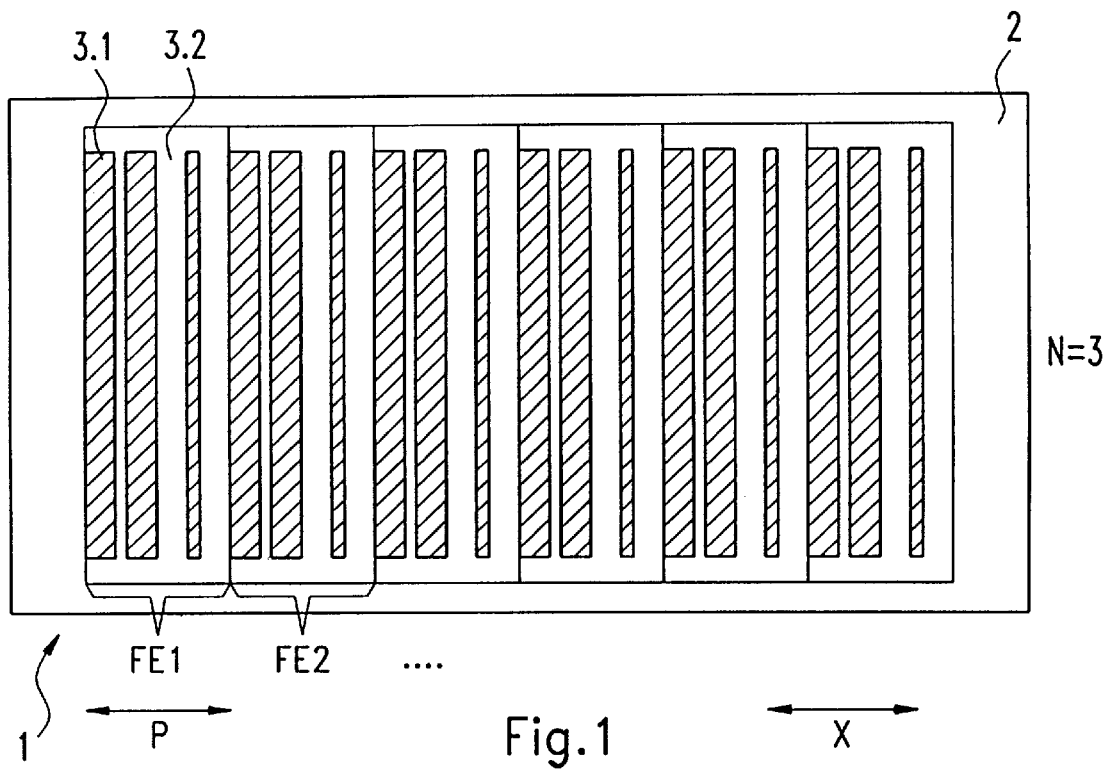
FIG. 1 illustrates a front view of a scanning plate according to a first preferred embodiment of the present invention.

First a brief discussion of theoretical considerations will be presented followed by a detailed description of the presently preferred embodiments of the invention.

The resulting intensity modulation that a first illuminated grating having a periodic division structure generates at a certain scanning distance is typically periodic and can therefore be represented as a known Fourier series, i.e., broken down into a fundamental component (n=1) and various harmonic components (n=2, 3, . . . ). Each of the individual harmonic components (n=2, 3, . . . ) arises as a result of the interference of a $k^{th}$ order of diffraction $E_k$ with a $(k-n)^{th}$ order of diffraction $E_{n-k}$ of the first grating. For a scanning distance of z=0 in a normal scanning arrangement, in order to filter a certain harmonic component with the ordinal number n, the sum of individual interference components $E_k \cdot E^*_{k-n}$ must be zero in each case, with the summation being effected by k. The individual interference components must accordingly cancel one another. However, individual existing interference components certainly do not furnish a vanishing amount of the total signal.

This filter condition is equivalent to the demand that the location-dependent transmission function of the scanning grating have no frequency component with the location frequency d/n, where d describes the period of the intensity modulation in the applicable intensity pattern. In the case where it is desired that all the harmonic components be filtered out, accordingly it is known that the location-dependent transmission function of the scanning grating must be selected to have a cosine or sinusoidal form.

Now if the various orders of diffraction, and thus the interference components as well, are phase-displaced from one another by a finite scanning distance z>0, for instance in the aforementioned inverse scanning arrangement, then the resultant phase displacement must be taken into account in designing the structure of the filtering scanning plate. However, the filter structures of short period length known thus far do not take this phase displacement into account. As already indicated above, the balance of the interference components to be added up in the spacing range, $z > \frac{1}{4}(d^2/\lambda)$ where $\lambda$ corresponds to the wavelength of light used, is destroyed, so that no further usable filtering action results. In principle, however, this phase displacement can also be compensated for by a suitably corrected design of the filter structure. However, that in turn is possible only for a defined scanning distance z. Since higher orders of diffraction are involved when harmonic signal components occur, the resultant phase displacement of these orders of diffraction varies so sensitively and fast by the scanning distance z that even upon the tiniest changes in a scanning distance z, once set, the desired filtering action breaks down. The requisite distance independence of the filtering action with respect to a predetermined harmonic signal component can be attained only if every interference component $E_k \cdot E^*_{k-n}$ contributing to this harmonic becomes zero on its own or separately, and accordingly the mutual compensation of different interference components is no longer necessary, which is achieved according to the invention by certain provisions. The resultant phase displacement of various orders of diffraction at varying scanning distances z then no longer play any role. The corresponding condition that interference components $E_k \cdot E^*_{k-n}$ vanish or become zero can be met according to the invention for a certain quantity of odd- numbered harmonic signal components (n=3, 5, . . . ).

In the device embodied according to the invention, both phase and amplitude structures can be used inside the scanning plate. In the case where the scanning structure is designed in the form of amplitude structures, intensity modulations occur in the shadowed region $z<<\frac{1}{2}(d^2/\lambda)$ and at the distances $z=m$ $(d^2/\lambda)$, where m=1, 2, . . . , or in other words in integral multiples of the so-called Talbot distances. Conversely, when phase structures, preferably with a phase rise of 90°, are used as the scanning structure, intensity modulations in the half-integral Talbot distances $z=(m+\frac{1}{2})$ $(d^2/\lambda)$, where m=1, 2, . . . are the result.

In both cases, the scale graduation is preferably located remote from the scanning plate in the region of the integral or half-integral Talbot distances, or at least in a region where a high intensity modulation results in each case. The embodiment of the scanning plate according to the invention can therefore be realized both with an amplitude structure and with a phase structure. In the exemplary embodiment described below, the bars of a phase structure or the lines of an amplitude structure are both referred to in general terms as structural elements. Between the structural elements called "bars" and "lines" in the case of the phase structure and the amplitude structure respectively, further structural elements, called gaps, are provided.

FIG. 1 illustrates a front view of a scanning plate according to a first preferred embodiment of the invention. The scanning plate 1 includes a periodic arrangement in the measurement direction X of a plurality of identical filter elements FE1, FE2, . . . on a suitable carrier substrate 2. The direction of relative displacement of the scanning plate and the scale graduation (not shown) is designated as the measurement direction X. The filter elements FE1, FE2, . . . in turn contain a plurality of structural elements 3.1, 3.2, which are designed as a bar-gap sequence or a line-gap sequence, depending on whether a phase structure or amplitude structure is used. The selected width of the filter elements FE1, FE2, etc. will be called the superstructure period P according to the invention is selected as an odd-numbered multiple N of a graduation period $d_A$; that is, $P=N \cdot d_A$, where N>1. The graduation period $d_A$ represents the graduation period of the conventional scanning plate without filtering action that is to be replaced by the scanning plate of the present invention. Typically, or in an advantageous embodiment, the graduation period $d_A$ of the hypothetical scanning plate without filtering action is identical to the graduation period $d_M$ of the scale graduation (not shown). It is appropriate to dimension $d_A$ in this way for instance where the scanning plate and scale graduation are exposed to collimated light. In principle, especially in the case of other lighting configurations, such as a divergent light for the scanning plate and scale .graduation, however, a graduation period $d_A$ is selected that is not identical to the graduation period $d_M$ of the scale graduation. Since according to the invention the superstructure period P of the scanning plate 1 is selected to be greater than the period $d_A$, additional diffraction orders $E_{kappa/N}$ result, where kappa=( . . . ,−2, −1, 1, 2, . . . ). These additionally created orders of diffraction $E_{kappa/N}$ are located between the orders of diffraction $E_k$, where k=. . . , −2, −1, 0, 1, 2, . . . ) of the (hypothetical) scanning grating or the hypothetical scanning plate without filtering properties. The orders of diffraction which finally result via the scanning plate 1 embodied according to the invention are designated by the non-integral subscripts k/n, where once again N represents the odd number that indicates the number of graduation periods $d_A$ within the superstructure period P. In order to achieve the desired distance-independent filtration of the harmonic signal component, as explained above, each of the interference components $E_{kappa/N} \cdot E_{kappa/N-n}$ must equal zero. Solving this problem is accomplished according to the invention using certain symmetry concepts.

Accordingly, the scanning plate 1 according to the invention has filter elements FE1, FE2, each formed by two halves, which have a width $N \cdot d_A/2$. Both halves of each filter element FE1, FE2, . . . are in turn structured to be complementary to one another.

Figure 2:
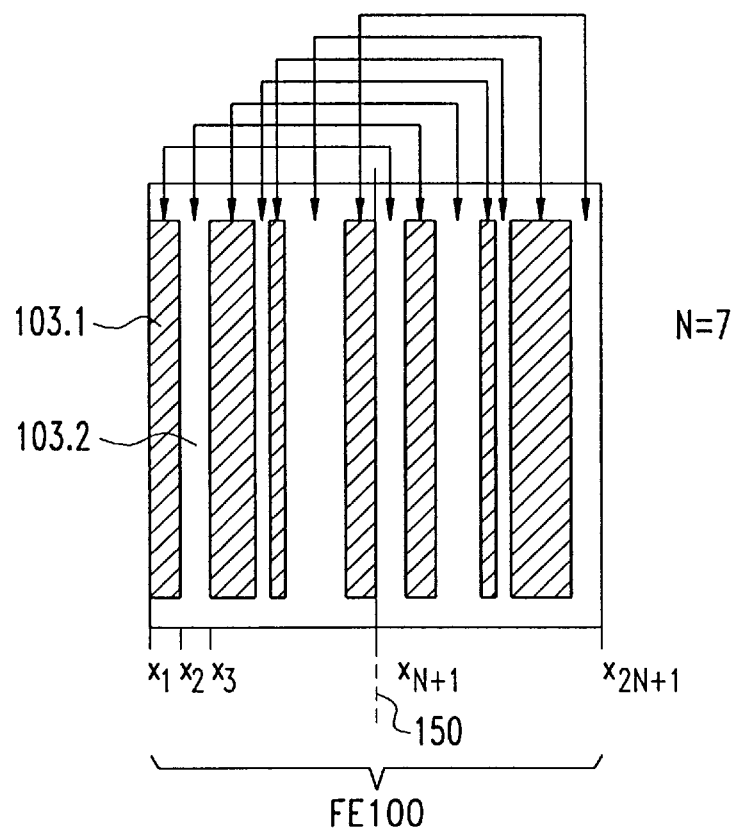
FIG. 2 illustrates an enlarged front view of a portion of a scanning plate according to a second preferred embodiment of the present invention.

For more detailed explanation of this requisite property of the filter elements, reference will be to FIG. 2. FIG. 2 illustrates an enlarged front view of a portion of a scanning plate according to a second preferred embodiment of the present invention. The aforementioned complementary embodiment of the two halves of the filter elements is understood to mean that the structure of the first half of the filter element FE100 can be converted into the structure of the second half of the filter element FE100, by replacing each bar 103.1 or opaque line 103.1 with a gap 103.2 of the same width, and vice versa; that is, each gap 103.2 is replaced by a bar 103.1 or opaque line 103.1 of the same width. Each filter element FE100 thus comprises mutually complementary halves, which are divided by an imaginary dividing line 150. To illustrate the complementary structure of the two halves of the filter element FE100 shown, the respective complementary structural elements of both halves have been connected by arrows above the Figure.

On the basis of this embodiment of the filter elements FE1, FE2 and FE100, all the orders of diffraction $E_{kappa/N}$ with an even-numbered kappa, except for kappa=0, can be suppressed. This relationship is also known for the simplest periodic and complementary structure where N=1. This would correspond for instance to a phase or amplitude grating that is divided with a ratio of 1:1 and comprises a periodic arrangement of bars or lines and gaps of the same width.

Because of the complementary embodiment of the filter elements in the case where N>1, nearly all the possible interference components $E_{kappa/N} \cdot E_{kappa/N-n}$ which generate the undesired odd-numbered harmonic signal components disappear. It is always the orders of diffraction $E_{kappa/N}$ with an odd-numbered kappa and suppressed orders of diffraction $E_{kappa'/N}$ with an even-numbered kappa', where kappa'= kappa−(n•N) and, n•N is always even-numbered, that are made to interfere with one another, and vice versa.

The interference components that still remain and that continue to contribute to the $n^{th}$ harmonic are $E_n \cdot E^*_0$ and $E_{-n} \cdot E^*_0$. To eliminate these persistent interference components as well, one further condition must be taken into account in embodying the filter elements or the filter element halves. To that end, the orders of diffraction $E_n$ and $E_{-n}$ having a subscript n of all the odd-numbered harmonic signal components to be filtered must be suppressed. To that end, the location of the structural elements inside a half of the filter element must be chosen accordingly. However, this presents one skilled in the relevant art with a familiar task. The requisite determination of the edge positions of the structural elements inside one half of the filter element will therefore be explained only briefly below in conjunction with FIG. 2.

Let $x_l$ (l=1, 2, 3, . . . , N) designate the edge positions of the structural elements in the left half of the filter element FE100. The reference system is also chosen such that the dividing line 150 corresponds to the position having the coordinate of zero. Inside the left half of the filter element FE100, using the terminology chosen, accordingly the edge positions from $x_2$–$x_N$ are to be determined; the edge position $X_N$+1 is indicated by the location of the dividing line 150. The edge position for $x_1$ is obtained, on the basis of the determination equation, already explained, for the periodicity P and the reference coordinate, chosen to be zero, for the dividing line 150, as $x_1 = -N \cdot d_A/2$. The subsequent edge positions $X_2$ . . . $X_N$ of the left half of the filter element FE100, conversely, should be chosen such that the predetermined orders of diffraction n are suppressed. To that end, for the all the odd-numbered harmonic components n to be filtered, the following equation (1) must be fulfilled:

$$\sum_{i=1}^{N} (-1)^l \, e^{2\pi i n x_i / d_A} = 0 \quad \text{(Equation 1)}$$

Taking into account the above-explained symmetry conditions for the left and right halves of the filter element FE100, the edge positions of the right half of the filter element FE100, arranged complementary to the dividing line 150, are also obtained from the determined edge positions of the left half of the filter element FE100.

The embodiment of the filter elements according to the invention, by way of the complementary embodiment of the two filter element halves in combination with the odd number of graduation periods $d_A$ per filter element, thus assures the fundamental prerequisite for the distance-independent filtration of odd-numbered harmonic signal components.

For a number M of harmonics to be filtered, the complex equation (1) must be fulfilled in each case. This is compared to N–1 edge positions $x_2$, $x_3$, . . . ,$X_N$ to be determined. To obtain at least one solution, the following equation (2) must therefore be satisfied:

$$N - 1 \geq 2M \quad \text{(Equation 2)}$$

Preferably, the parameter N is selected to be as small as is still just barely possible as a result of equation (2), but this is not an absolute condition for the filtration according to the invention.

In the exemplary embodiment of the scanning plate 1 shown in FIG. 1, filtration of the third harmonic is provided (M=1) and on the basis of equation (2), N=3 was accordingly chosen. As a rule, a plurality of scanning fields embodied in this way are also provided on the scanning plate 1, but they are not shown in FIG. 1. In the exemplary embodiment of FIG. 1, a total of six filter elements FE1,FE2, . . . are arranged in the measuring direction X. Typical orders of magnitude for the number of filter elements provided per scanning field are between 5 and 10. Depending on the scanning configuration, however, other parameters may also be chosen.

The embodiment of the filter elements shown in FIG. 2 assures a filtration of the third, fifth and seventh harmonic; taking equation (2) into account, N=7 was chosen.

Figure 3:
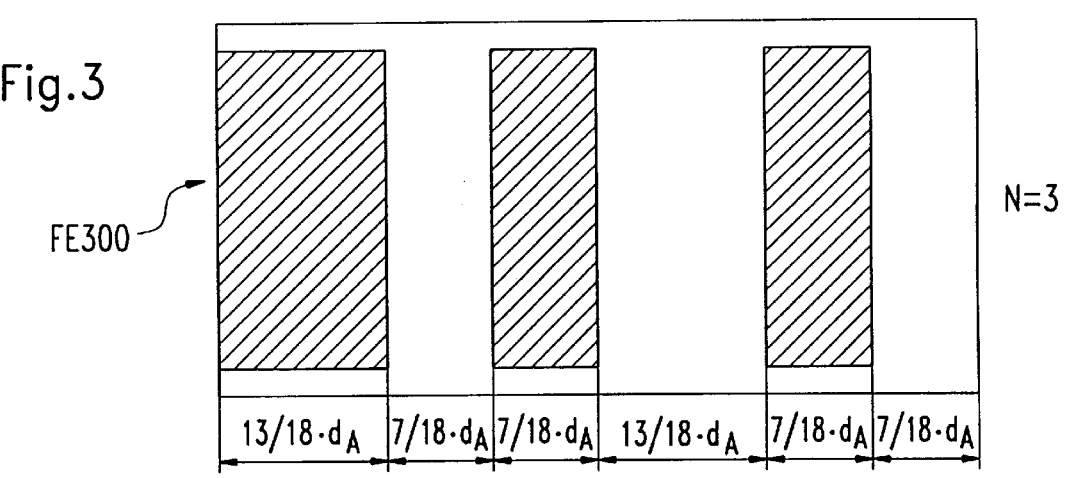
FIG. 3 illustrates an enlarged front view of a portion of a scanning plate according to a third preferred embodiment of the present invention.
Figure 4:
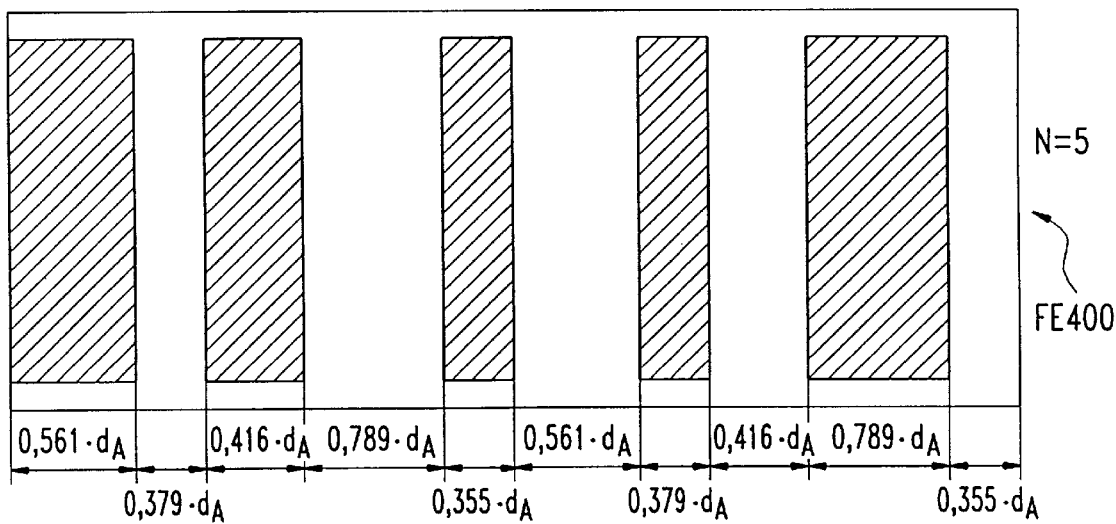
FIG. 4 illustrates an enlarged front view of a portion of a scanning plate according to a fourth preferred embodiment of the present invention.

Other embodiments of the filter elements contemplated are shown in FIGS. 3 and 4. FIGS. 3 and 4 illustrate an enlarged front view of a portion of a scanning plate according to a third and fourth preferred embodiment respectively. FIGS. 3 and 4 also explicitly show the width of the individual structural elements, in each case in fractions of the variable $d_A$, which as explained above represents the graduation period of the conventional scanning plate without filtering action that is to be replaced, and this graduation period may for instance be identical to the graduation period of the scale graduation.

In FIG. 3, a width $P=3d_A$ of the filter element FE300 has therefore been provided, or in other words N=3 has been chosen; this produces a filtration of the third harmonic. Determining the widths of the individual structural elements is tantamount to determining the edge positions of the structural elements, at least in the left half of the filter element FE300. To that end, the above-shown equation (1) was therefore solved for the third harmonic to be filtered.

In the exemplary embodiment of FIG. 4, the filter element FE400 shown, or the periodic succession of such filter elements, assures the simultaneous filtration of the third and fifth harmonics; hence the parameter N was selected as N=5. Determining the width of the individual structural elements, given in fractions $d_A$, or determining the corresponding edge positions, was again accomplished by solving equation (1) for the third and fifth harmonics to be filtered. The width P of a filter element FE400 is $P=5d_A$.

Figure 5:
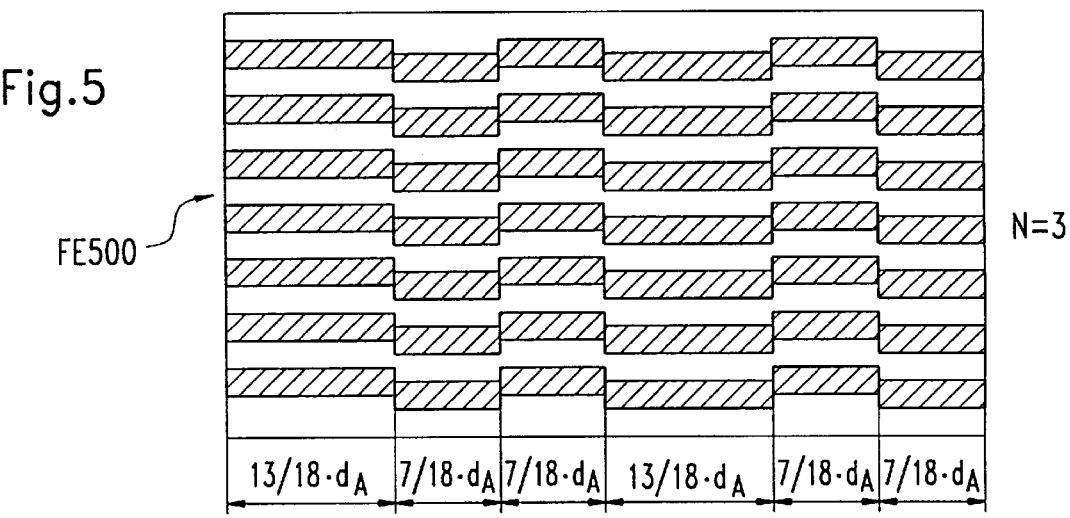
FIG. 5 illustrates an enlarged front view of a portion of a scanning plate according to a fifth preferred embodiment of the present invention in which the structural elements have an additional transversal structure.

In addition to the structuring of the scanning plate in the measuring direction according to the present invention in the form of a succession of bars or lines and gaps, the individual structural elements can moreover be embodied as arbitrary diffracting structures as well. It is thus possible, for example, to assign the structural elements a periodic structure oriented transversely to the measuring direction X. FIG. 5 illustrates an enlarged front view of a portion of a scanning plate according to a fifth preferred embodiment of the present invention. The embodiment of this filter element FE500 was based on the structure of the preferred embodiment shown in FIG. 3, that is, the filtration of the third harmonic is attained with N=3 and the corresponding width of the individual structural elements. In addition, however, the individual structural elements also all have diffracting structures oriented transversely to the measuring direction, so that the split beams passing through are deflected in a transverse direction as disclosed in German Patent application No. DE 195 11 068.4, not yet published, which is assigned to the present assignee and is hereby incorporated by reference.

Figure 6:
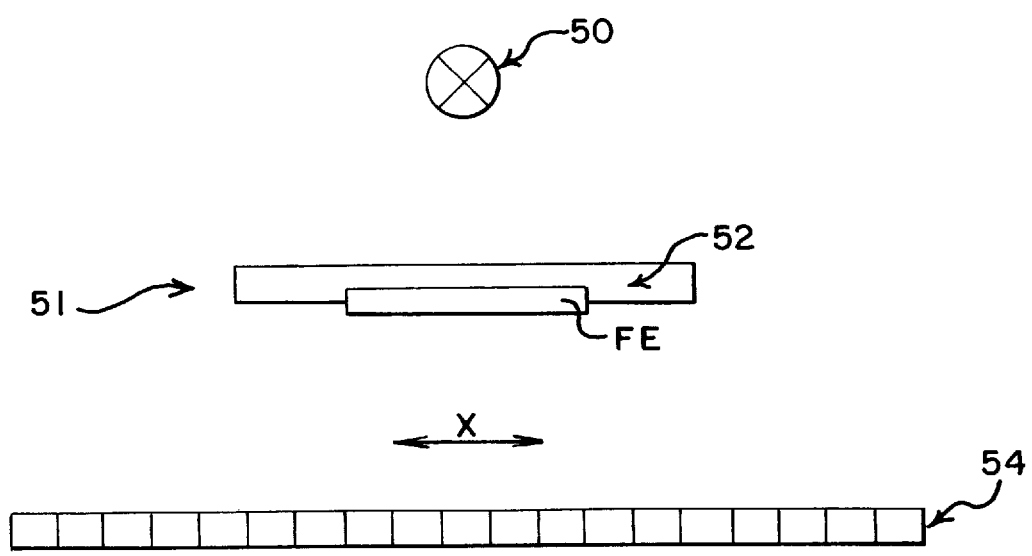
FIG. 6 is a schematic illustration of a position measuring instrument incorporating any one of the scanning plates of the present invention.

FIG. 6 is a schematic illustration of a position measuring instrument incorporating any one of the scanning plates of the present invention. The position measuring instrument includes a light source 50, a scale graduation 54 located downstream of the light source 50 and a scanning plate 51 located between the light source 50 and the scale graduation 54. The direction of relative displacement of the scanning plate 51 and scale graduation 54 is designated as the measurement direction X. The scanning plate 51 has a plurality of filter elements FE disposed on a carrier substrate for filtering odd-numbered harmonic signal components from a periodic signal that is generated by scanning the scale graduation 54 with the scanning plate 51 as previously described. The scanning plate 51 may have any of the previously described filtering elements FE disposed on the carrier substrate.

The device according to the invention can accordingly be modified in many ways and adapted flexibly to certain demands. For instance, it can be used in position measuring instruments for detecting linear motions as well as in position measuring instruments for detecting rotary motions, and so forth.

It is to be understood that the forms of the invention as described herein are to be taken as preferred examples and that various changes and modifications in shape, size and arrangement of parts may be resorted to without departing from the spirit of the invention or scope of the claims.

What is claimed is:

1. A scanning plate for filtering odd-numbered harmonic signal components from a periodic signal that is generated by scanning a periodic scale graduation with the scanning plate, the scanning plate comprising:

a periodic sequence of individual filter elements in a measuring direction wherein for a resultant period P of the filter elements the condition $P = N \cdot d_A$ applies, where N is an odd integer greater than 1 and $d_A$ is the period of a scanning graduation for a scanning plate without filtering action, and a symmetrical arrangement of structural elements is provided in each filter element, so that two complementary halves with structural elements are provided in each filter element.

2. The scanning plate of claim 1, wherein in the filter element halves, the coordinates ($x_1$) of the structural element edges for each harmonic (N) to be filtered meet the following condition, so that the orders of diffraction belonging to each filtering harmonic N are suppressed:

$$\sum_{i=1}^{N} (-1)^i \, e^{2\pi i n x_i / d_A} = 0. \qquad \text{(Equation 1)}$$

3. The scanning plate of claim 1, further comprising a light source wherein light from the light source first passes through the scanning plate before reaching a scale graduation or a further scanning plate.

4. The scanning plate of claim 1, wherein the number N of the graduation periods $d_A$ per filter element and the number M of the harmonics to be filtered meet the following determining equation:

$$N - 1 \geq 2M \qquad \text{(Equation 2)}.$$

5. The scanning plate of claim 1, wherein the period of the scanning graduation $d_A$ is equivalent to the period of a scale graduation used in conjunction with the scanning plate.

6. The scanning plate of claim 3, wherein the scanning plate is disposed at a distance from the scale graduation in the vicinity of integral or half-integral Talbot distances.

7. The scanning plate of claim 1, wherein the scanning plate has a phase structure, and the structural elements of the filter elements are formed by a sequence of bars and gaps.

8. The scanning plate of claim 1, wherein the scanning plate is an amplitude structure, and the structural elements of the filter elements are formed by a sequence of opaque lines and transparent gaps.

9. A position measuring instrument for detecting linear or rotary motion, the position measuring instrument comprising:

a light source;

a periodic scale graduation located downstream of the light source; and a scanning plate located between the light source and periodic scale graduation for filtering odd-numbered harmonic signal components from a periodic signal that is generated by scanning the periodic scale graduation with the scanning plate, the scanning plate having a periodic sequence of individual filter elements in a measuring direction wherein for a resultant period P of the filter elements the condition $P = N \cdot d_A$ applies, where N is an odd integer greater than 1 and $d_A$ is the period of a scanning graduation for a scanning plate without filtering action and a symmetrical arrangement of structural elements provided in each filter element so that two complementary halves with structural elements are provided in each filter element.

10. The scanning plate of claim 9, wherein in the filter element halves, the coordinates ($x_1$) of the structural element edges for each harmonic (N) to be filtered meet the following condition, so that the orders of diffraction belonging to each filtering harmonic N are suppressed:

$$\sum_{i=1}^{N} (-1)^i \, e^{2\pi i n x_i / d_A} = 0. \qquad \text{(Equation 1)}$$

11. The scanning plate of claim 9, further comprising a light source wherein light from the light source first passes through the scanning plate before reaching a scale graduation or a further scanning plate.

12. The scanning plate of claim 9, wherein the number N of the graduation periods $d_A$ per filter element and the number M of the harmonics to be filtered meet the following determining equation:

$$N - 1 \geq 2M \qquad \text{(Equation 2)}.$$

13. The scanning plate of claim 9, wherein the period of the scanning graduation $d_A$ is equivalent to the period of a scale graduation used in conjunction with the scanning plate.

14. The scanning plate of claim 11, wherein the scanning plate is disposed at a distance from the scale graduation in the vicinity of integral or half-integral Talbot distances.

15. The scanning plate of claim 9, wherein the scanning plate has a phase structure, and the structural elements of the filter elements are formed by a sequence of bars and gaps.

16. The scanning plate of claim 9, wherein the scanning plate is an amplitude structure, and the structural elements of the filter elements are formed by a sequence of opaque lines and transparent gaps.

* * * * *

UNITED STATES PATENT AND TRADEMARK OFFICE
CERTIFICATE OF CORRECTION

PATENT NO. : 5,874,729
DATED : February 23, 1999
INVENTOR(S) : Wolfgang Holzapfel It is certified that error appears in the above-identified patent and that said Letters Patent is hereby corrected as shown below:

<u>In the Claims,</u>
<u>Claim 2,</u>
Equation 1, should read:

$$-- \sum_{l=1}^{N} (-1)^l e^{2\pi i n x_l / d_A} = 0. \qquad \text{(Equation 1)} --.$$

<u>Claim 10,</u>
Equation 1, should read:

$$-- \sum_{l=1}^{N} (-1)^l e^{2\pi i n x_l / d_A} = 0. \qquad \text{(Equation 3)} --.$$

<u>Claim 12,</u>
Please change "(Equation 2)" to -- (Equation 4) --.

Signed and Sealed this

Eighteenth Day of September, 2001

Attest:

*Attesting Officer*

NICHOLAS P. GODICI
*Acting Director of the United States Patent and Trademark Office*